(12) United States Patent
Sugaya

(10) Patent No.: US 11,361,463 B2
(45) Date of Patent: Jun. 14, 2022

(54) POSITION ESTIMATION SYSTEM AND METHOD, AND NON-TRANSITORY STORAGE MEDIUM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 193 days.

(21) Appl. No.: 16/651,430

(22) PCT Filed: Sep. 28, 2017

(86) PCT No.: PCT/JP2017/035308
§ 371 (c)(1),
(2) Date: Jun. 2, 2020

(87) PCT Pub. No.: WO2019/064457
PCT Pub. Date: Apr. 4, 2019

(65) Prior Publication Data
US 2020/0311959 A1 Oct. 1, 2020

(51) Int. Cl.
*G06T 7/70* (2017.01)
*H04N 5/232* (2006.01)
*B64C 39/02* (2006.01)

(52) U.S. Cl.
CPC .............. *G06T 7/70* (2017.01); *B64C 39/024* (2013.01); *H04N 5/23299* (2018.08); *B64C 2201/123* (2013.01); *B64C 2201/127* (2013.01)

(58) Field of Classification Search
CPC ... G06T 7/70; G06T 2207/10032; G06T 7/55; G06T 2207/10016; G06T 2207/30244;
(Continued)

(56) References Cited

U.S. PATENT DOCUMENTS 5,845,048 A * 12/1998 Masumoto ............. B25J 9/1697
706/20
2012/0106800 A1 * 5/2012 Khan ................... G06K 9/6269
382/104
(Continued)

FOREIGN PATENT DOCUMENTS

CN 104880177 A 9/2015
CN 106062510 A 10/2016
(Continued)

OTHER PUBLICATIONS

Office Action dated Feb. 9, 2021 by the CIPO in the corresponding Chinese Patent Application No. 201780095465.1.

*Primary Examiner* — Jerome Grant, II
(74) *Attorney, Agent, or Firm* — Norton Rose Fulbright US LLP; James R. Crawford

(57) ABSTRACT

Provided is a computer system for estimating an absolute position of a photographed object by just photographing the object with a camera, a position estimation method, and a program. The computer system acquires an image obtained by photographing an object, acquires three-dimensional position data of a camera which photographed the object, and estimates an absolute position of the object on the basis of the three-dimensional position data of the camera. Further, the computer system enables the camera to be tilted a specified angle in a direction of the object, and estimates the absolute position of the object on the basis of the three-dimensional position data of the camera and the tilted specified angle. Moreover, the computer system stores the position of the object and an altitude at the position in association with each other, and estimates an altitude associated with the estimated position of the object.

5 Claims, 4 Drawing Sheets

(58) Field of Classification Search
CPC ... G06T 7/74; B64C 39/024; B64C 2201/123;
B64C 2201/127; B64C 2201/12; H04N
5/23299; H04N 5/23218; H04N 5/23229;
G01B 21/00
USPC ......................................................... 382/100
See application file for complete search history.

(56) References Cited

U.S. PATENT DOCUMENTS

| | | | |
|---|---|---|---|
| 2013/0266205 | A1* | 10/2013 | Valpola .................. B25J 9/1697 382/153 |
| 2017/0017240 | A1* | 1/2017 | Sharma ................. B64C 39/024 |
| 2017/0067734 | A1 | 3/2017 | Heidemann et al. |
| 2017/0301109 | A1* | 10/2017 | Chan .......................... G06T 7/73 |
| 2021/0117677 | A1* | 4/2021 | Loveland ............... G06V 20/58 |
| 2021/0240207 | A1* | 8/2021 | Gury ..................... B64C 39/024 |

FOREIGN PATENT DOCUMENTS

| | | |
|---|---|---|
| CN | 107000832 A | 8/2017 |
| JP | 11-166827 A | 6/1999 |
| JP | 2000-13782 A | 1/2000 |
| JP | 2008-90808 A | 4/2008 |
| JP | 2016-105081 A | 6/2016 |
| JP | 2017-32276 A | 2/2017 |
| WO | 2015/163107 A1 | 10/2015 |

* cited by examiner

POSITION ESTIMATION SYSTEM AND METHOD, AND NON-TRANSITORY STORAGE MEDIUM

CROSS REFERENCE TO RELATED APPLICATIONS

This application is a national phase under 35 U.S.C. 371 of International Patent Application No. PCT/JP2017/035308 filed Sep. 28, 2017, which is hereby incorporated herein by reference in its entirety.

TECHNICAL FIELD

The present disclosure relates to a computer system with which a position of an object is estimated by photographing the object, a position estimation method, and a program.

BACKGROUND

In recent years, an unmanned aerial vehicle (UAV) or the like takes various images from the sky. In such photographing, in order to estimate position data (latitude and longitude) of an object photographed in this image, the UAV is controlled to fly above the object. In such position estimation, since the position data of the UAV is known, the position data of the UAV is estimated as the position data of the object so as to carry out the position estimation.

However, since it takes time to move the UAV above the object, a method different from the method described above is required to estimate the position data of the object. It is known that in a method of estimating position data of an object, for example, an object is photographed by a stereo camera, and position data of the object is estimated based on the photographed image and a tilt of the stereo camera detected by a gyroscope sensor (see patent literature 1).

LITERATURE IN THE RELATED ART

Patent Literature

Patent document 1: Japanese Laid-open Patent Application No. 2017-32276.

SUMMARY

However, in the configuration of the patent literature 1, since the object must be photographed with a stereo camera, the stereo camera is mounted on the UAV or the like, leading to an increase in cost, an increase in size of the device, and a decrease in flight time due to an increase in power consumption, and thus reduced convenience.

The purpose of the present disclosure is to provide a computer system with which convenience is improved as a result of estimating an absolute position of a photographed object by just photographing the object with a camera, a position estimation method, and a program.

The present disclosure provides a computer system. The computer system is provided with an image acquisition unit, which is configured to acquire an image obtained by photographing an object; a position data acquisition unit, which is configured to acquire three-dimensional position data of a camera which photographed the object; and a position estimation unit, which is configured to estimate an absolute position of the object on the basis of the three-dimensional position data of the camera.

According to the present disclosure, the computer system acquires an image obtained by photographing an object, acquires three-dimensional position data of a camera which photographed the object, and estimates an absolute position of the object on the basis of the three-dimensional position data of the camera.

The present disclosure is of the type of computer system, but other types such as a position estimation method and a program still have the same effect and performance.

Effects of the Present Disclosure

According to the present disclosure, a computer system with which convenience is improved as a result of estimating an absolute position of a photographed object by just photographing the object with a camera, a position estimation method, and a program can be provided.

DETAILED DESCRIPTION

Optimum embodiments for implementing the present disclosure will be described below with reference to the drawings. It is to be noted that the embodiments are only examples and not intended to limit the scope of the present disclosure.

Summary of a Position Estimation System 1

Figure 1:
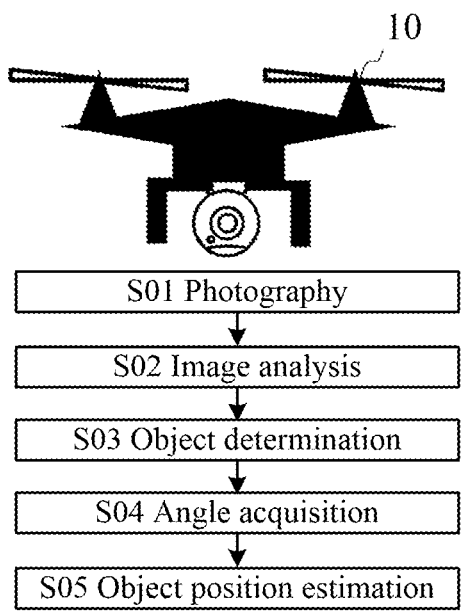
FIG. 1 is a schematic view illustrating a position estimation system 1.

The summary of an embodiment of the present disclosure will be described on the basis of FIG. 1. FIG. 1 is a diagram used for describing the summary of the position estimation system 1 as an embodiment of the present disclosure. The position estimation system 1 is a computer system composed of an unmanned aerial vehicle (UAV) 10 which flies at a specified flight altitude and takes various dynamic images and stationary images.

The UAV 10 is provided with a photographing device such as a camera for taking dynamic images and stationary images, various sensors such as a gyroscope sensor for detecting a tilt of the photographing device, an acceleration sensor, an altimeter and a wind direction sensor, and propellers and power required for flight, etc. The UAV 10 flies along a preset flight path or a flight path specified by an information terminal (not shown).

The UAV 10 acquires and stores data (feature points, feature quantities, etc.) related to an object whose position is to be estimated. The data may be acquired form the information terminal (not shown), or the data related to the object may be inputted into the UAV 10.

It is to be noted that the UAV 10 may be connected to the information terminal (not shown) in a wireless way or wired way. In this case, the UAV 10 may send data detected by various sensors and photographed images to the information terminal.

First, the UAV 10 flies along a preset flight path, and photographs the area directly below the UAV itself with the photographing device (step S01). This flight path includes the flight altitude, waypoints, and the latitude/longitude during the flight of the UAV.

The UAV 10 acquires an image photographed by the photographing device as a photographed image, and analyzes the acquired photographed image (step S02). The UAV 10 analyzes one or both of a feature point and a feature quantity of the photographed image to determine an object included in the photographed image. The feature point refers to something photographed in the photographed image, specifically, a shape, a color, brightness, an outline, and the like. Further, the feature quantity refers to a statistical value such as various values (average, variance, histogram, etc. of pixel values) calculated from the photographed image data.

The UAV 10 compares the pre-acquired object data with the feature point and feature quantity of the photographed image obtained as a result of image analysis, and analyzes whether there is an object in the photographed image through the image analysis.

The UAV 10 determines whether the photographed image contains the object according to the result of the image analysis. In condition that the UAV 10 determines that the photographed image does not contain the object, the UAV 10 continues to fly along the set flight path. On the other hand, in condition that the UAV 10 determines that the photographed image contains the object, the UAV 10 determines a position of the object in the photographed image (step S03). Through the above processing, the UAV 10 acquires the photographed image of the object and determines the position of the object.

In this case, the UAV 10 acquires the position data of the photographing device as position data (latitude, longitude, flight altitude, etc.) of the UAV 10 itself. Through the above processing, the UAV 10 acquires three-dimensional position data of the photographing device which photographed the object.

The UAV 10 rotates the photographing device based on the position of the object determined in the photographed image so as to make the photographing device at a position parallel to a straight line indicating the latitude of the UAV itself. The UAV 10 acquires an angle A with respect to the object at this position (step S04). The angle A is an angle at which the photographing device is tilted with respect to the object with reference to an angle at which the photographing device photographs the object right below the UAV itself.

The UAV 10 estimates the position of the object according to the flight altitude of the UAV 10 itself and a tangent of the angle A (step S05). The UAV 10 calculates distance from the UAV itself to the object according to the flight altitude of the UAV 10 itself and the tangent of the angle A. In addition, the UAV 10 estimates the position of the object according to the calculated distance and the position of the UAV 10 itself. Through this processing, an absolute position of the object is estimated on the basis of three-dimensional position data of the photographing device.

The above is the summary of the position estimation system 1.

System Composition of the Position Estimation System 1

Figure 2:
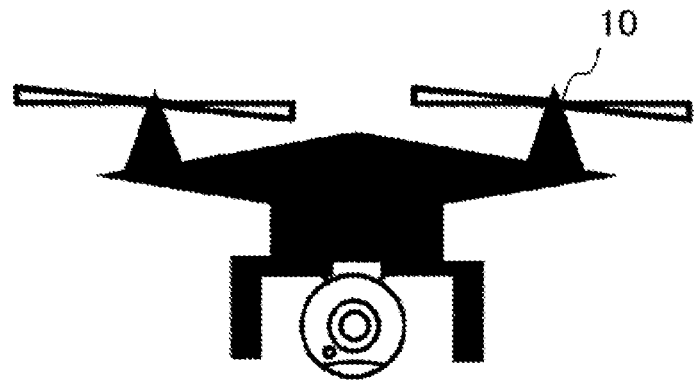
FIG. 2 is an overall composition view illustrating the position estimation system 1.

The system composition of the position estimation system 1 as an embodiment of the present disclosure will be described based on FIG. 2. FIG. 2 is a diagram of the system composition of the position estimation system 1 as an embodiment of the present disclosure. The position estimation system 1 is a computer system composed of a UAV 10.

The UAV 10 is the unmanned aerial vehicle having functions described below.

Description of Functions

Figure 3:
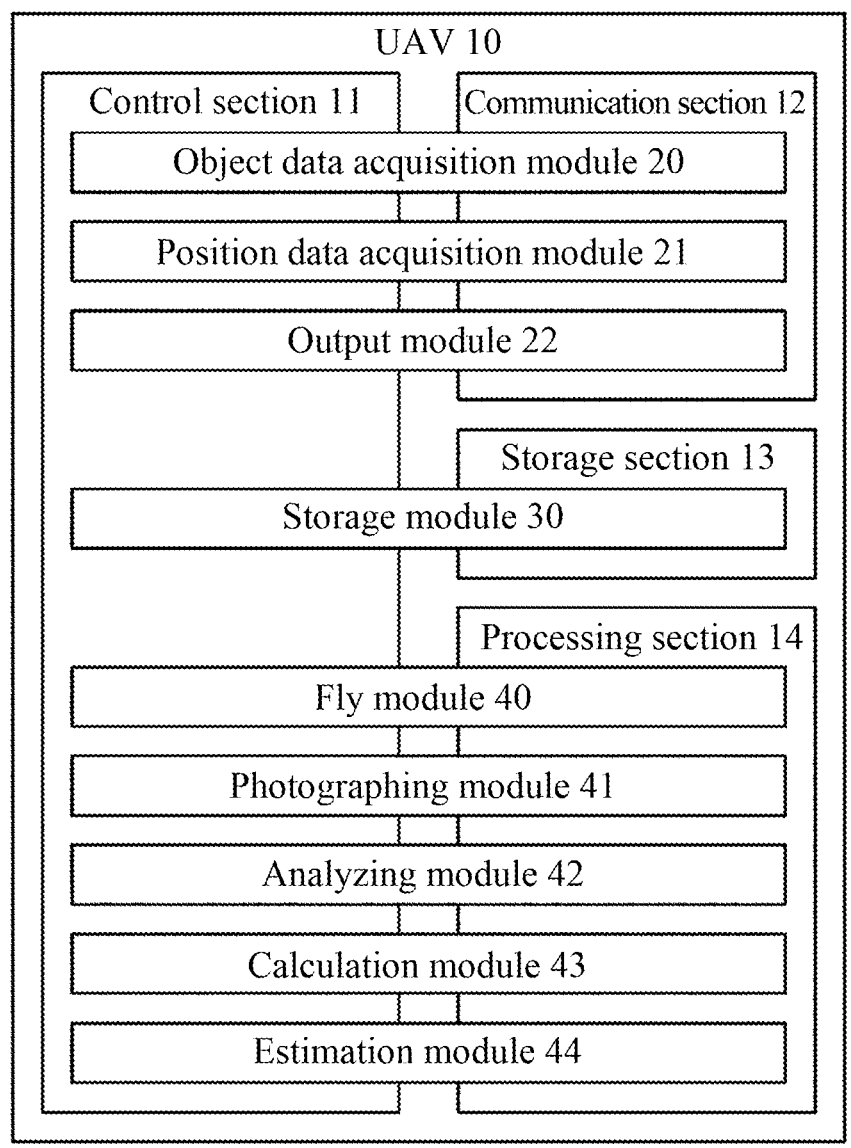
FIG. 3 is a functional block view illustrating an unmanned aerial vehicle 10.

The functions of the position estimation system 1 as an embodiment of the present disclosure will be described based on FIG. 3. FIG. 3 is a functional block view illustrating a UAV 10.

The UAV 10 includes a control section 11 which is provided with a central processing unit (CPU), a random access memory (RAM), a read only memory (ROM) and the like, and a communication section 12 which is provided with a device which can communicate with other machines, such as a wireless fidelity (WiFi) device based on the IEEE802.11 standards. Further, the UAV 10 includes a storage section 13 for storing data as such as a hard disk, a semiconductor memory, a recording medium, a memory card and the like. Further, the UAV 10 includes a processing section 14, which is provided with a device for executing various processing such as image processing, various calculations, processing of position data of the UAV 10 itself, control and processing of the photographing device of the UAV 10 itself, and the like.

In the UAV 10, the control section 11 reads specific programs and cooperates with the communication section 12 to implement an object data acquisition module 20, a position data acquisition module 21 and an output module 22. Further, in the UAV 10, the control section 11 reads specific programs and cooperates with the storage section 13 to implement a storage module 30. Further, in the UAV 10, the control section 11 reads specific programs and cooperates with the processing section 14 to implement a fly module 40, a photographing module 41, an analyzing module 42, a calculation module 43 and an estimation module 44.

Position Estimation Processing

Figure 4:
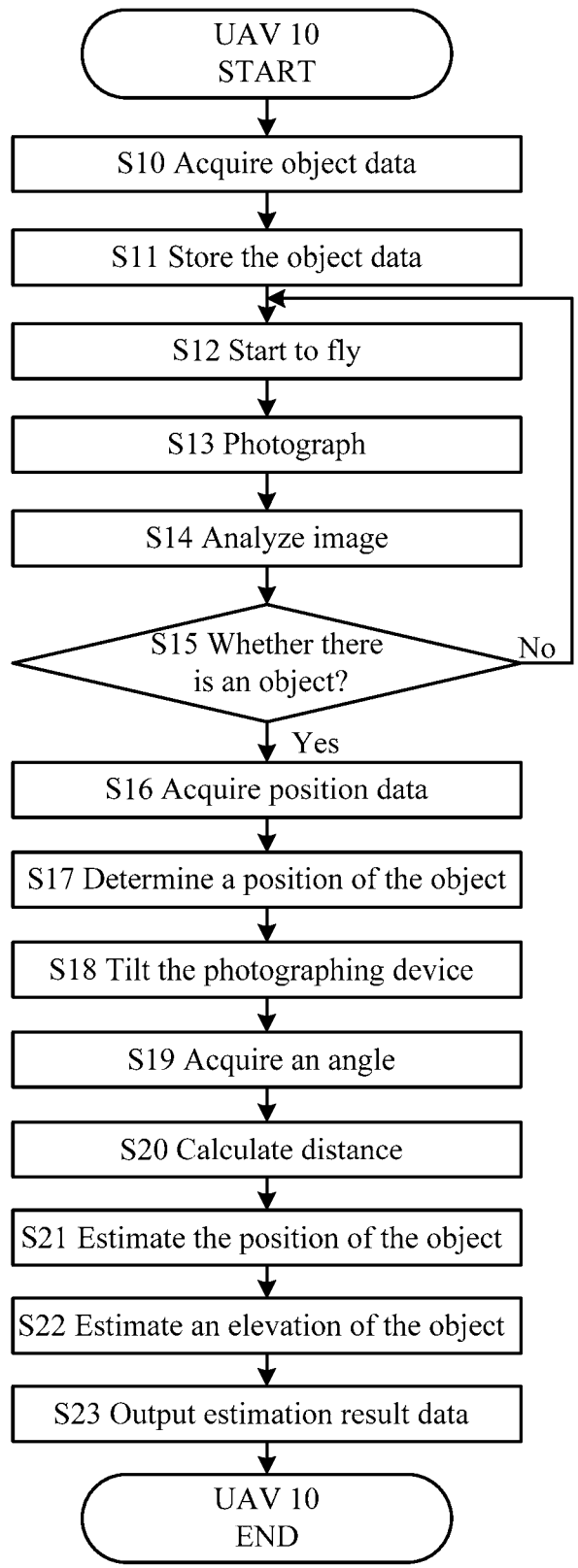
FIG. 4 is a flowchart illustrating position estimation processing executed by the unmanned aerial vehicle 10.

The learning processing executed by the position estimation computer system 1 will be described based on FIG. 4. FIG. 4 is a flowchart illustrating position estimation processing executed by the UAV 10. Processing executed by each of the above modules will be described in conjunction with the processing.

First, the object data acquisition module 20 acquires object data as data related to an object (step S10). In the step S10, the object data acquisition module 20 acquires the object data of the object whose position is to be estimated. The object data, for example, refers to data which can uniquely identify the object, and in addition to the name, type and the like of the object, also includes a feature point and a feature quantity of the object. The feature point is, for example, a shape, a color, brightness, an outline, and the like of the object. Further, the feature quantity, for example, is a statistical value such as an average, variance and a histogram of pixel values. Such feature points and feature quantities are acquired by performing data communication with the information terminal (not shown) in a wireless way or in a wired way.

The storage module 30 stores the object data (step S11).

The fly module 40 starts to fly along a preset flight path (step S12). In the step S12, the fly module 40 flies along a flight path stored in the storage module 30 or according to an indication from the information terminal (not shown). In this case, the flight path includes data related to the flight altitude, latitude and longitude during the flight of the UAV itself.

The photographing module 41 takes a photographed image (step S13). In step S13, the photographing module 41 takes a photographed image with the photographing device oriented in a direction perpendicular to the UAV 10, that is, the photographing module 41 photographs the area directly below the UAV 10.

The analyzing module 42 performs image analysis on the photographed image (step S14). In the step S14, one or both of the feature point and the feature quantity of the photographed image is analyzed, such that the object photographed in the photographed image is analyzed.

The analyzing module 42 compares the object data stored in the step S11 with the feature point and feature quantity of the photographed image obtained as the result of image analysis, and determines whether there is an object in the photographed image (step S15). In step S15, the analyzing module 42 determines whether there is object data which is consistent with the feature point and feature quantity of the photographed image.

In the step S15, in condition that the analyzing module 42 determines that the result of the image analysis is that the feature point and feature quantity of the photographed image are inconsistent with the feature point and feature quantity of the object data ("No" in step S15), it is determined that the object does not exist, and the fly module 40 re-executes the processing in the step S12 described above, and continues to fly.

On the other hand, in the step S15, in condition that the analyzing module 42 determines that the result of the image analysis is that the feature point and feature quantity of the photographed image are consistent with the feature point and feature quantity of the object data ("Yes" in step S15), it is determined that the object exists, and the position data acquisition module 21 acquires current three-dimensional position data of the UAV itself (step S16). In the step S16, the position data acquisition module 21 acquires position data of the UAV itself based on GPS. Further, the position data acquisition module 21 acquires flight altitude data of the UAV itself from the flight path set in the step S12 described above. The position data acquisition module 21 acquires position data and light altitude data of the UAV 10, so as to acquire the three-dimensional position data of the UAV 10. In this way, three-dimensional position data of the photographing device which photographed the object can be acquired. This is because the position data of the UAV 10 is substantially the same as the position data of the photographing device, that is, the position data acquisition module 21 acquires the three-dimensional position data of the photographing device and thus acquires the three-dimensional position data of the UAV 10.

It is to be noted that the position data acquisition module 21 may acquire the position data of the UAV itself from the currently set flight path. It is to be noted that the processing in the step S16 may be executed at any timing before the absolute position of the object is estimated.

The analyzing module 42 determines the position of the object in the photographed image (step S17). In the step S17, the analyzing module 42 determines the position of the object by getting coordinates of the object in the photographed image with reference to the center of the photographed image. It is to be noted that the analyzing module 42 may also determine the position of the object in the photographed image in other manners.

The photographing module 41, based on the position of the determined object in the photographed image, rotates the photographing device to make it face the position of the object, and tilts the photographing device at a specified angle in the direction of the object (step S18). In the step S18, the photographing module 41 rotates the photographing device at a position parallel to a straight line indicating the latitude of the UAV itself, so as to make the photographing device tilt at the specified angle.

The photographing module 41 acquires an angle A of the photographing device at this position with respect to the object (step S19). In the step S19, the photographing module 41, with reference to a state when the photographing device photographs the area right below itself, acquires an angle between this reference and the state in which the photographing device is directed to the object as the angle A. This angle A is equivalent to the angle at which the photographing device titles.

The calculation module 43 calculates distance from the UAV to the object based on a tangent of the angle A and the flight altitude data acquired by the position data acquisition module 21 (step S20).

The estimation module 44 estimates an absolute position of the object according to the calculated distance from the UAV to the object and the position data of the UAV. In the step S21, the estimation module 44 estimates the position based on the calculated distance and the latitude of the position data acquired by the position data acquisition module 21, that is, since the UAV and the object are on the same longitude, the analyzing module 44 calculates latitude of the object by adding the calculated distance to or subtracting the calculated distance from the latitude in the position data (whether to add or subtract is determined based on the coordinates of the object in the photographed image). The estimation module 44 estimates the absolute position of the object based on the calculated latitude of the object and the longitude of the UAV.

Figure 5:
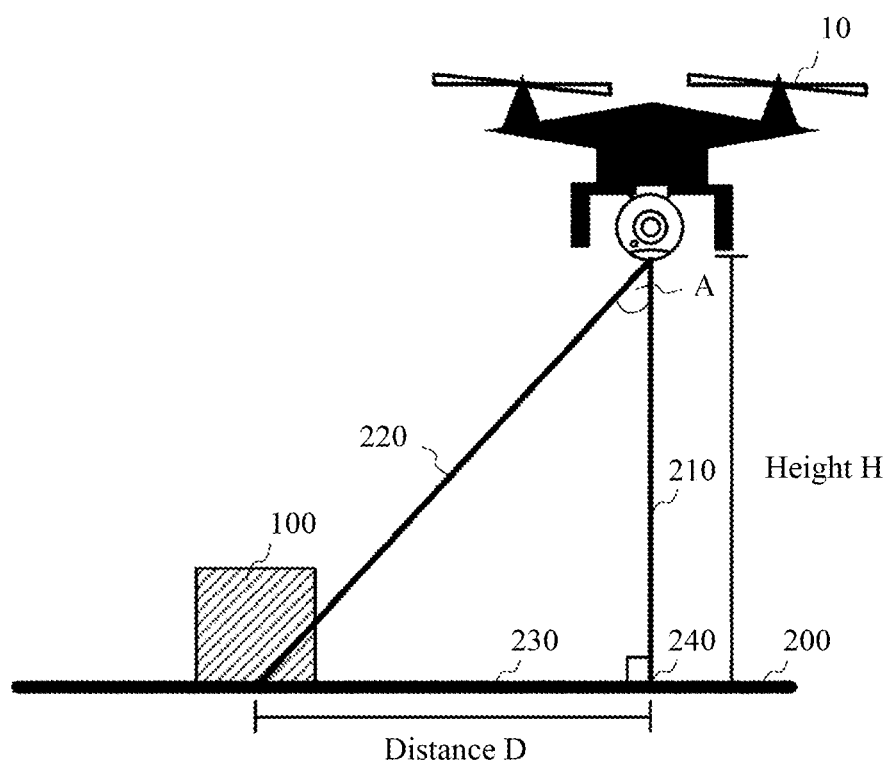
FIG. 5 is a schematic view illustrating position estimation of an object executed by the unmanned aerial vehicle 10.

The method for estimating the absolute position of the object executed by the estimation module 44 will be described based on FIG. 5. FIG. 5 is a view illustrating the method for the estimation module 44 to estimate the absolute position of the object 100. In FIG. 5, the case in which the UAV 10 estimates the absolute position of the object 100 on the ground 200 is described.

A right triangle is hypothetically formed by a perpendicular line 210 from the photographing device to the ground 200, a straight line (oblique line 220) extending from the photographing device to the object 100, and a straight line (adjacent side 230) connecting the object 100 and a point 240 where the perpendicular line 210 is orthogonal to the ground 200. The angle A at which the photographing module 41 tilts the photographing device refers to an angle between the perpendicular line 210 and the oblique line 220. The values required for the estimation module 44 to estimate the absolute position of the object include distance D which is the length of the adjacent side 230, the position of the UAV 10, and height H which is the length of the perpendicular line 210.

First, the position of the UAV 10 may be acquired from position data acquired from GPS or a current position of the flight path. The height H may also be acquired in the same way of acquiring the position of the UAV 10. The distance D may be estimated according to coordinates (e.g., XY coordinates) of the point 240, the tangent (value of tan A) of the angle A and the height H, that is, the absolute position of the object 100 is estimated by performing the additive or subtraction operation between the estimated distance D and the value of the X coordinate of the coordinates of the point 240.

The estimation module 44 estimates an elevation of the object (step S22). In the step S22, the estimation module 44 estimates the elevation of the object based on a database established for each position pre-stored in the storage section 30 and the elevation of this position. In this database, the correspondence between the latitude/longitude of each position and the elevation of the latitude/longitude is established. The estimation module 44 estimates the elevation corresponding to the absolute position (latitude/longitude) of the object estimated in the processing of the step S21 described above with reference to this database.

The output module 22 outputs the estimated position (latitude/longitude and elevation) of the objected and the identifier which can uniquely identify the object as estimation result data (step S23). In step S23, the output module 22 may output the estimation result data to the information terminal (not shown), or may output the estimation result data to the storage module 30 and store it in the storage module 30.

It is to be noted that the above embodiments are described on the premise that the object is a still object, but the object may also be a moving object such as animals. In this case, besides the position of the object, the calculation module 43 may also need to calculate the speed of the object, that is, as the object moves at a right angle with respect to the UAV 10, the photographing module 41 takes images of the object before and after it moves, and the estimation module 44 estimates positions of the object at each time point, and the calculation module 43 calculates the speed of the object based on the distance between two points of each position and the moving time.

In the above processing, the UAV 10 executes the image analysis processing, various calculation processing and various estimation processing, but either or both of these processing need not necessarily be executed by the UAV 10. For example, the UAV 10 may send data required for these processing to the information terminal or the like, and the information terminal or the like, and the information terminal or the like may execute these processing.

Further, the above embodiments are described on the premise that there is only one object, and even if there are multiple objects, the present disclosure can also be applied. In this case, the position estimation described above is only performed on each object. Specifically, in condition that it is determined that there are multiple objects in a photographed image, the position of each object existing in the photographed image is estimated according to a predetermined condition (in an ascending order of distances from the coordinates to the center of the photographed image, in a descending order of distances from coordinates to the center of the photographed image, or in a descending order of priorities early set for each object).

The above units and functions are implemented by reading and executing a specified program by a computer (including a CPU, an information processing apparatus and various terminals). The program is provided, for example, in the form of being provided by a computer via a network (i.e., software as a service (SaaS)). Further, the program is provided in the form of being recorded on a computer-readable recording medium such as a floppy disk, a compact disk (CD) (such as a compact disc read-only memory (CD-ROM)), and a digital versatile disc (DVD) (such as a digital versatile disc read-only memory (DVD-ROM) and a digital versatile disc random access memory (DVD-RAM)).

In this case, the computer reads the program from the recording medium and transfers the program to an internal storage device or an external storage device for storage and execution. Further, the program may also be previously recorded on a storage apparatus (recording medium) such as a magnetic disk, an optical disk or a magneto-optical disk, and provided from the storage apparatus for the computer via a communication line.

The embodiments of the present disclosure have been described above, but the present disclosure is not limited to the above-mentioned embodiments. In addition, the effects described in the embodiments of the present disclosure are merely illustrative of the best effects produced by the present disclosure, and the effects of the present disclosure are not limited to the effects described in the embodiments of the present disclosure.

REFERENCE LIST

1: position estimation system
10: unmanned aerial vehicle.

What is claimed is:
1. A position estimation system, comprising an unmanned aerial vehicle (UAV),
wherein the UAV comprises a control section, a storage section and a camera,
wherein the storage section comprises an object data storage unit configured to store object data for determining whether a target object exists in an image photographing by the camera of the UAV;
the control section comprises:
a photographing unit, which is configured to direct a photographing direction of the camera to a direction of gravity and photograph images of areas right below the UAV during the UAV flying;
an analyzing unit, which is configured to determine whether the object data stored in the object data storage unit is consistent with a result of image analysis for each of the images photographed by the photographing unit;
a position data acquisition unit, which is configured to, in response to determining that the target object exists in one image when the object data stored in the object data storage unit is consistent with a result of image analysis for the one image photographed by the photographing unit, acquire position data and flight altitude data H of the UAV as three-dimensional position data of the camera which photographs the target object;
a temporary position determination unit, which is configured to determine a temporary position of the target object according to a center of the one image including the target object and the three-dimensional data of the camera;
a camera tilting unit, which is configured to tilt the photographing direction of the camera from a position corresponding to the three-dimensional position data of the camera to the temporary position of the target object, and obtain an angle A between a line representing the flight altitude data H of the UAV and a line connecting the camera to the target object; and
an absolute position estimation unit, which is configured to calculate a distance from the UAV to the target object based on a tangent of the angle A and the flight altitude data H of the UAV, and estimate an absolute position of the target object according to the calculated distance and the three-dimensional position data of the camera.

2. The position estimation system of claim 1, wherein
the storage section further comprises a storage unit, which is configured to store a position and an altitude at the position in association with each other;
the absolute position estimation unit is configured to estimate the altitude associated with the estimated absolute position.

3. A position estimation method, executed by an unmanned aerial vehicle (UAV) comprising a control section, a storage section and a camera,
wherein the storage section comprises an object data storage unit configured to store object data for determining whether a target object exists in an image photographing by the camera of the UAV;
wherein the control section comprises:
a step of directing a photographing direction of the camera to a direction of gravity and photographing images of areas right below the UAV during the UAV flying;
a step of determining whether the object data stored in the object data storage unit is consistent with a result of image analysis for each of the photographed images;
a step of, in response to determining that the target object exists in one image when the object data stored in the object data storage unit is consistent with a result of image analysis for the one image photographed, acquiring position data and flight altitude data H of the UAV as three-dimensional position data of the camera which photographs the target object;
a step of determining a temporary position of the target object according to a center of the one image including the target object and the three-dimensional data of the camera;
a step of tilting the photographing direction of the camera from a position corresponding to the three-dimensional position data of the camera to the temporary position of the target object, and obtaining an angle A between a line representing the flight altitude data H of the UAV and a line connecting the camera to the target object;
a step of calculating a distance from the UAV to the target object based on a tangent of the angle A and the flight altitude data H of the UAV; and
a step of estimating an absolute position of the target object according to the calculated distance and the three-dimensional position data of the camera.

4. A non-transitory computer-readable storage medium having stored thereon instructions which when executed by a processor perform the position estimation method of claim 3.

5. A computer-readable program, wherein a position estimation system comprises an unmanned aerial vehicle (UAV), the UAV comprises a control section, a storage section and a camera, wherein the storage section comprises an object data storage unit configured to store object data for determining whether a target object exists in an image photographing by the camera of the UAV; wherein the program is configured to enable the position estimation system to execute:
a step of directing a photographing direction of the camera to a direction of gravity and photographing images of areas right below the UAV during the UAV flying;
a step of determining whether the object data stored in the object data storage unit is consistent with a result of image analysis for each of the photographed images;
a step of, in response to determining that the target object exists in one image when the object data stored in the object data storage unit is consistent with a result of image analysis for the one image photographed, acquiring position data and flight altitude data H of the UAV as three-dimensional position data of the camera which photographed photographs the target object;
a step of determining a temporary position of the target object according to a center of the one image including the target object and the three-dimensional data of the camera;
a step of tilting the photographing direction of the camera from a position corresponding to the three-dimensional position data of the camera to the temporary position of the target object, and obtaining an angle A between a line representing the flight altitude data H of the UAV and a line connecting the camera to the target object;
a step of calculating a distance from the UAV to the target object based on a tangent of the angle A and the flight altitude data H of the UAV; and
a step of estimating an absolute position of the target object of according to the calculated distance and the three-dimensional position data of the camera.

* * * * *